Jan. 8, 1935. E. SCHNITZLER 1,987,247
PROTECTING FILM ROLLS FROM THE ENTRY OF LIGHT
Filed Aug. 19, 1932

Inventor:
Eduard Schnitzler,
By Attorney
Philip S. Hopkins.

Patented Jan. 8, 1935

1,987,247

UNITED STATES PATENT OFFICE 1,987,247

PROTECTING FILM ROLLS FROM THE ENTRY OF LIGHT

Eduard Schnitzler, Wolfen, near Bitterfeld, Germany, assignor to Agfa Ansco Corporation, Binghamton, N. Y., a corporation of New York Application August 19, 1932, Serial No. 629,548
In Germany August 21, 1931

7 Claims. (Cl. 95—9)

My present invention relates to a device for protecting film rolls wound on spools from the entry of light.

In the copending application Serial Number 551,225, filed July 16, 1931 by Kurt Hipke, there has already been disclosed such a device consisting of an open-ended casing of an elastic material having a longitudinal slot extending between its ends and lined on its inner surface with velvet or a similar material and adapted to be placed on the film roll so as to cover the edges of the flanges carried on the ends of the spool. The length of the casing is chosen so as to extend a little over the flanges of the spool at both sides, its inner diameter being equal to the diameter of the spool flanges. For use the casing is fitted over the film roll in such a way that the core of the spool is inside the casing and that the casing covers the edges of the flanges of the spool. The displacement of the spools inside the casing is prevented by the flanges being in a frictional grip with the velvet with which the inner surface of the casing is lined.

The object of the present invention is an improvement in the casing so that the spool is forcibly kept in a fixed position. A further object is to shape the means fixing the spool in the casing in such a manner as to prevent an undesired opening of the elastic casing essentially if the same is made of a material which is not highly elastic, for instance, cardboard. Reference is made to the accompanying drawing showing some examples of such casings the same reference characters denoting like parts.

Figure 1:
Fig. 1 is a longitudinal view, partly in cross section, of one form of my invention.

I have found that it is advantageous to provide the casing with means for securing the spool in such a way that it can no longer be displaced in the direction of the axle of the spool. To this end the edges of the casing 1, either wholly or partly, are extended over the flanges of the spool 2 and the extending part is, as represented in Figs. 1 and 1a, flanged inwards, as indicated at 3 of these figures.

Figure 2:
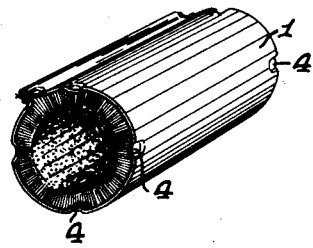
Figs. 2 and 3 are perspective views of modified forms of my invention.
Figure 3:
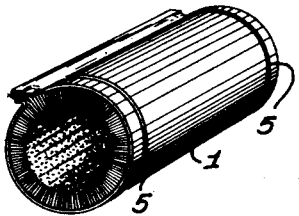
Figure 4:
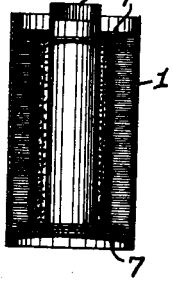
Fig. 4 is a longitudinal view, partly in cross-section, of a further modified form.
Figure 7:
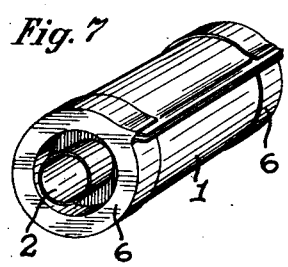
Figure 8:
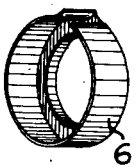
Fig. 8 is a perspective view of the cap 6 of Fig. 7.

Instead of being flanged, the edges of the casing extending over the flanges of the spool may be provided on their interior surface with concavities or pittings 4 as shown in Fig. 2, or seams 5 as shown in Fig. 3 which prevent the spools from being displaced laterally. Furthermore, it is possible instead of forming the flanges of the casing, destined for fixing the position of the spool as a part of the light-tight casing itself, to fit on the edges of the casing caps 6 bearing flanges. In Fig. 7 there is shown a casing provided at both ends with caps 6, and Fig. 8 shows a cap as fitted on the ends of the casing. This form of the invention is particularly suited if the casing is made of a material like cardboard. Another embodiment, see Fig. 4, consists in pressing into the casing at one or both of its ends an annular disc 7 the outer diameter of which corresponds to the inner diameter of the casing. This annular disc may be secured to the casing in any suitable manner.

Figure 1A:
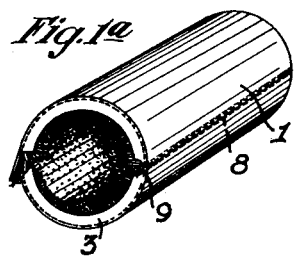
Fig. 1a is a perspective view of the same form.

In order to facilitate the removal of the spool from the light-tight casing, the casings may, advantageously opposite the slot, be provided with a milled groove or seam 8 as shown in Fig. 1a extending in the longitudinal direction thereof which have the effect that the casing is opened at this place and that the breaking of the casing is facilitated. The flanged edges of the casing, in this case, are preferably provided with a cut out a at the place of the groove or the seam 9 (see Fig. 1a).

Figure 5:
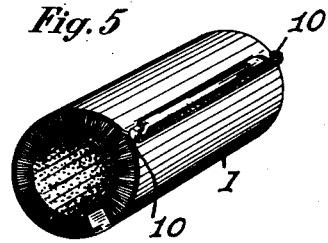
Figs. 5, 6 and 7 are perspective views of still further modified forms.
Figure 6:
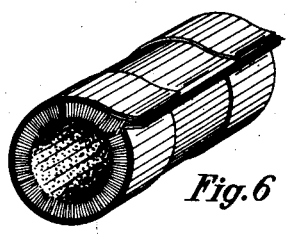

For preventing any unvoluntary opening of the light-tight casing the same can be secured by clamps. Instead of using removable clamps there may be provided at one end or at both ends of the light-tight casing means which by being bent keep the casing together, as, for instance, shown at 10 of Fig. 5. It is also possible to place elastic rings round the casing for pressing the casing tightly to the flanges of the spool as seen in Fig. 6. This embodiment is of special importance if the casing is made of a flexible material of a kind of cardboard. The means described for holding the light-tight casing together may also be combined.

The light-tight casings of the kind described can be made of metal or other resilient or elastic materials, such as of vulcanized fiber, ebonite, cellulose derivatives, cardboard or the like. The velvet lining either directly stuck to the inner surface of the casing or applied, prior to being attached to the inner surface, on a special support of an elastic or a stiff material, may wholly or partly be replaced by other elastic materials, for instance, felt, fustian, caoutchouc, etc.

For designating the position of the threading slit in the core of a spool, being inserted in the still unopened light-tight casing, it is advisable to mark the place of the outer surface corresponding to the said slit in a suitable way. The light-tight casing may likewise be provided with a corresponding sign whereby it may be recognized when the threading slit of the spool core has been given such a position with respect to the slit provided in the light-tight casing, that the film can be threaded into the slit of the spool core through the slit provided in the light-tight casing.

My invention is not limited to the examples given in the specification. Various changes may occur to those skilled in the art and I contemplate as included within my invention all such modifications as fall within the scope of the appended claims.

What I claim is:

1. A device for protecting film rolls wound on spools provided with flanges from the entry of light comprising a cylindrical open-sided casing made of an elastic material and provided with a longitudinal slit extending from one end of the casing to the other, said casing and said slit being lined on the interior surface with velvet or a similar material, said casing being somewhat longer than the distance of the flanges of the spool and having approximately the same diameter as the flanges of the spool, and means for securing the spool in said casing against lateral displacement.

2. A device for protecting film rolls wound on spools provided with flanges from the entry of light comprising a cylindrical open-sided casing made of an elastic material and provided with a longitudinal slit extending from one end of the casing to the other, said casing and said slit being lined on the interior surface with velevt or a similar material, said casing being somewhat longer than the distance of the flanges of the spool and having approximately the same diameter as the flanges of the spool, means for securing the spool in the casing against lateral displacement, and means for preventing an undesired opening of the casing.

3. A device for protecting film rolls wound on spools provided with flanges from the entry of light comprising a cylindrical open-sided casing made of an elastic material and provided with a longitudinal slit extending from one end of the casing to the other, said casing and said slit being lined on the interior surface with velvet or a similar material, said casing being somewhat longer than the distance of the flanges of the spool and having approximately the same diameter as the flanges of the spool, the casing being provided on both ends with caps.

4. A device for protecting film rolls wound on spools provided with flanges from the entry of light comprising a cylindrical open-sided casing made of an elastic material and provided with a longitudinal slit extending from one end of the casing to the other, said casing and said slit being lined on the interior surface with velvet or a similar material, said casing being somewhat longer than the distance of the flanges of the spool and having approximately the same diameter as the flanges of the spool, the casing being provided on both ends with elastic rings extending around the casing.

5. A device for protecting film rolls wound on spools provided with flanges from the entry of light comprising a cylindrical open-sided casing made of an elastic material and provided with a longitudinal slit extending from one end of the casing to the other, said casing and said slit being lined on the interior surface with velvet or a similar material, said casing being somewhat longer than the distance of the flanges of the spool and having approximately the same diameter as the flanges of the spool the casing being provided with two annular disks pressed on both sides into the casing.

6. A device for protecting film rolls wound on spools provided with flanges from the entry of light, comprising a cylindrical open-sided casing made of a cardboard and provided with a longitudinal slit extending from one end of the casing to the other, said casing and said slit being lined on the interior surface with velvet or a similar material, said casing being somewhat longer than the distance of the flanges of the spool and having approximately the same diameter as the flanges of the spool, the casing being provided on both ends with caps.

7. A device for protecting film rolls wound on spools provided with flanges from the entry of light, comprising a cylindrical open-sided casing provided with a longitudinal slit extending from one end of the casing to the other, and said casing being lined on its interior surface with velvet or a similar material, said casing being somewhat longer than the distance of the flanges of the spool and having approximately the same diameter as the flanges of the spool, and cap-like, light-tight means provided on both ends of the casing for securing the spool in said casing against lateral displacement.

EDUARD SCHNITZLER.